United States Patent
Yu et al.

(10) Patent No.: US 11,548,516 B2
(45) Date of Patent: Jan. 10, 2023

(54) DATA ACQUISITION METHOD, APPARATUS, DEVICE AND COMPUTER-READABLE STORAGE MEDIUM

(71) Applicant: Beijing Baidu Netcom Science and Technology Co., Ltd., Beijing (CN)

(72) Inventors: Ning Yu, Beijing (CN); Fan Yang, Beijing (CN); Chengfa Wang, Beijing (CN); Gaifan Li, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 67 days.

(21) Appl. No.: 17/251,168

(22) PCT Filed: Dec. 17, 2019

(86) PCT No.: PCT/CN2019/125955
§ 371 (c)(1),
(2) Date: Dec. 10, 2020

(87) PCT Pub. No.: WO2020/147482
PCT Pub. Date: Jul. 23, 2020

(65) Prior Publication Data
US 2021/0261141 A1    Aug. 26, 2021

(30) Foreign Application Priority Data
Jan. 15, 2019   (CN) .......................... 201910036974.8

(51) Int. Cl.
*B60W 40/09* (2012.01)
*B60W 40/06* (2012.01)
(Continued)

(52) U.S. Cl.
CPC ............ *B60W 40/09* (2013.01); *B60W 40/06* (2013.01); *B60W 40/105* (2013.01);
(Continued)

(58) Field of Classification Search
CPC .... B60W 40/09; B60W 40/06; B60W 40/105; B60W 40/107; B60W 2556/05;
(Continued)

(56) References Cited

U.S. PATENT DOCUMENTS 7,729,856 B2   6/2010   Danz
9,046,374 B2   6/2015   Ricci
(Continued)

FOREIGN PATENT DOCUMENTS

CA    3 028 595 A1    1/2018
CN    1791806 A       6/2006
(Continued)

OTHER PUBLICATIONS

WO-2013162161-A1 translation (Year: 2013).*
Communication Pursuant to Article 94(3) EPC, dated Apr. 25, 2022, for European Application No. 19 910 218.7-1009, 9 pages.

*Primary Examiner* — Jeff A Burke
*Assistant Examiner* — Kyle T Johnson
(74) *Attorney, Agent, or Firm* — Seed IP Law Group LLP

(57) ABSTRACT

The present disclosure provides a data acquisition method, apparatus, device and computer readable storage medium. According to the embodiments of the present disclosure, determination is made as to whether a preset stable driving condition is met based on acquired driving scene data of the driving scene where the vehicle is currently located, and acquired driving behavior data; if the preset stable driving condition is met, the driving scene data and the driving behavior data are acquired at a frequency lower than a preset sampling frequency. As a result, it is possible to reduce data redundancy in similar scenes and similar diving modes, reduce the amount of data, reduce occupation of the storage resources and transmission resources and facilitate subsequent analysis, and it is possible to implement the dynamic
(Continued)

Determine whether a preset stable driving condition is met based on acquired driving scene data and driving behavior data — 101

If the preset stable driving condition is met, acquire the driving scene data and the driving behavior data at a frequency lower than a preset sampling frequency — 102 acquisition of driving scene data and driving behavior data by scenes and modes.

10 Claims, 3 Drawing Sheets

(51) Int. Cl.
*B60W 40/105* (2012.01)
*B60W 40/107* (2012.01)
*G06V 20/56* (2022.01)

(52) U.S. Cl.
CPC .......... *B60W 40/107* (2013.01); *G06V 20/56* (2022.01); *B60W 2556/05* (2020.02); *B60W 2556/45* (2020.02)

(58) Field of Classification Search
CPC ... B60W 2556/45; G06V 20/56; G07C 5/008; G07C 5/08; G05B 19/04; G01C 21/16; H04N 7/181; H04N 7/18; H04L 12/40013; H04L 12/40; H04L 2012/40273
See application file for complete search history.

(56) References Cited

U.S. PATENT DOCUMENTS

| | | | |
|---|---|---|---|
| 10,126,722 B2 | 11/2018 | Sweet, III et al. | |
| 11,187,793 B1* | 11/2021 | Liu | G01S 17/931 |
| 2007/0027583 A1 | 2/2007 | Tamir et al. | |
| 2007/0182587 A1 | 8/2007 | Danz | |
| 2013/0282228 A1* | 10/2013 | Cawse | G07C 5/085 701/32.2 |
| 2014/0309789 A1* | 10/2014 | Ricci | G06F 16/25 700/276 |
| 2016/0203660 A1* | 7/2016 | Chowdhury | B60W 40/107 701/33.4 |
| 2016/0214611 A1* | 7/2016 | Neaves | F02D 29/02 |
| 2018/0032040 A1 | 2/2018 | Sweet, III et al. | |
| 2018/0081351 A1* | 3/2018 | Tankersley | G05D 1/0038 |
| 2018/0144621 A1* | 5/2018 | Arai | G08G 1/0133 |
| 2019/0158581 A1* | 5/2019 | Giannella | G06F 9/5011 |
| 2019/0324450 A1* | 10/2019 | Lurie | H04L 9/3247 |
| 2020/0174992 A1* | 6/2020 | Gilbertson | G05B 23/0221 |
| 2021/0261141 A1* | 8/2021 | Yu | H04L 12/40013 |

FOREIGN PATENT DOCUMENTS

| | | | | |
|---|---|---|---|---|
| CN | 100504438 C | 6/2009 | | |
| CN | 202404665 U | 8/2012 | | |
| CN | 103310501 A | 9/2013 | | |
| CN | 105096595 A | 11/2015 | | |
| CN | 105270411 A | 1/2016 | | |
| CN | 105282512 A | 1/2016 | | |
| CN | 105741381 A | 7/2016 | | |
| CN | 106023344 A | 10/2016 | | |
| CN | 106488191 A | 3/2017 | | |
| CN | 106550443 A | 3/2017 | | |
| CN | 206049659 U | 3/2017 | | |
| CN | 106646549 A | 5/2017 | | |
| CN | 106828502 A | 6/2017 | | |
| CN | 107025704 A | 8/2017 | | |
| CN | 108319637 A | 7/2018 | | |
| CN | 108482380 A | 9/2018 | | |
| CN | 108564681 A | 9/2018 | | |
| CN | 108932762 A | 12/2018 | | |
| CN | 109857002 A | 6/2019 | | |
| CN | 108482380 B | 9/2019 | | |
| DE | 10323144 A1 | 12/2004 | | |
| JP | 2016/186822 A | 10/2016 | | |
| JP | 6274270 B2 | 2/2018 | | |
| KR | 10-1071362 B1 | 10/2011 | | |
| TW | 201823899 A | 7/2018 | | |
| WO | 2004/104631 A1 | 12/2004 | | |
| WO | WO-2013162161 A1 * | 10/2013 | .......... | G03B 17/561 |
| WO | 2018/026420 A1 | 2/2018 | | |

* cited by examiner

DATA ACQUISITION METHOD, APPARATUS, DEVICE AND COMPUTER-READABLE STORAGE MEDIUM

The present disclosure claims priority to the Chinese patent application No. 201910036974.8 entitled "Data Acquisition Method, Apparatus, Device And Computer-Readable Storage Medium" filed on the filing date Jan. 15, 2019, the entire disclosure of which is hereby incorporated by reference in its entirety.

FIELD OF THE DISCLOSURE

The present disclosure relates to data processing technologies, and particularly to a data acquisition method, apparatus, device and computer-readable storage medium.

BACKGROUND OF THE DISCLOSURE

Real driving scene data and driver's driving behavior data in various driving scenes are of very important significance in aspects such as road condition construction, driving scene reconstruction, driver model construction, driving behavior analysis and learning, vehicle dynamics modeling and simulation, etc. It is necessary to use driving scene data in various driving scenes and driver's driving behavior data in actual research.

However, it is not easy to acquire and analyze real driving scene data and the driver's driving behavior data in various driving scenes. On the one hand, due to many and complex real driving scenes, many drivers and many vehicles are needed to acquire in a long period of time; on the other hand, the similarity between the driving scene data and the driver's driving behavior data in fixed routes, similar driving scenes, and similar driving modes is very high. Since the amount of driving scene data and driver's driving behavior data is enormous, there are much redundant data, a lot of storage resources and transmission resources need to be consumed subsequently, and analysis cannot be performed easily.

SUMMARY OF THE DISCLOSURE

A plurality of aspects of the present disclosure provide a data acquisition method, apparatus, device and computer-readable storage medium, to reduce data redundancy of the driving scene data and the driving behavior data.

An aspect of the present disclosure provides a data acquisition method, comprising:

determining whether a preset stable driving condition is met based on acquired driving scene data of a driving scene where the vehicle is currently located, and acquired driving behavior data;

if the preset stable driving condition is met, acquiring the driving scene data and the driving behavior data at a frequency lower than a preset sampling frequency.

The above aspect and any possible implementation further provides an implementation: the method further comprises:

acquiring the driving scene data and the driving behavior data at the preset sampling frequency, if the preset stable driving condition is not met.

The above aspect and any possible implementation further provides an implementation: the meeting the preset stable driving condition comprises:

a current driving speed of the vehicle is not greater than a first preset threshold, a magnitude of an acceleration of the vehicle in a driving direction is not greater than a second preset threshold, a magnitude of a transverse acceleration of the vehicle is not greater than a third preset threshold, a magnitude of an angular speed of the vehicle is not greater than a fourth preset threshold, the vehicle does not undergo a start and stop event; and/or the position where the vehicle is currently located is not within a preset range of a specific road condition.

The above aspect and any possible implementation further provides an implementation: the specific road condition comprises any one or more of the following: an intersection, a ramp entrance, a tunnel entrance or exit, a change point of the number of lanes, a traffic accident site, a bridge, and a preset location where stop or deceleration is performed.

The above aspect and any possible implementation further provides an implementation: the acquiring the driving scene data and the driving behavior data at the preset sampling frequency comprises:

acquiring the driving scene data at a first sampling frequency, and acquiring the driving behavior data at a second sampling frequency.

The above aspect and any possible implementation further provides an implementation: the acquiring the driving scene data at a first sampling frequency, and acquiring the driving behavior data at a second sampling frequency comprises:

acquiring the driving scene data at the first sampling frequency within a preset time length range, and acquiring the driving behavior data at the second sampling frequency within the preset time length range.

The above aspect and any possible implementation further provides an implementation: the acquiring the driving scene data and the driving behavior data at a frequency lower than a preset sampling frequency comprises:

acquiring the driving scene data at a third sampling frequency and acquiring the driving behavior data at a fourth sampling frequency; wherein the third sampling frequency is less than the first sampling frequency, and the fourth sampling frequency is less than the second sampling frequency.

The above aspect and any possible implementation further provides an implementation: before determining whether a preset stable driving condition is met based on acquired driving scene data of a driving scene where the vehicle is currently located, and acquired driving behavior data, the method further comprises:

acquiring the driving scene data with a sensor and obtaining the driving behavior data from the vehicle's Controller Area Network CAN; the driving scene data comprises: image data of a surrounding environment of the vehicle, position data of the vehicle, and vehicle posture data;

The above aspect and any possible implementation further provides an implementation: the acquiring the driving scene data with a sensor comprises:

acquiring image data of the surrounding environment of the vehicle with a camera, acquiring position data of the vehicle with a positioning module, and acquiring vehicle posture data of the vehicle with an inertial measurement unit, wherein the vehicle posture data comprises: an acceleration and an angular velocity of the vehicle in three coordinate axis directions in a three-dimensional coordinate system.

The above aspect and any possible implementation further provides an implementation: the determining whether a preset stable driving condition is met based on acquired driving scene data of a driving scene where the vehicle is currently located, and acquired driving behavior data further comprises:

determining whether the preset stable driving condition is met according to a first preset period based on the acquired driving scene data of the driving scene where the vehicle is currently located and the acquired driving behavior data.

The above aspect and any possible implementation further provides an implementation: after the acquiring the driving scene data and the driving behavior data, the method further comprises:

storing the acquired driving scene data and the driving behavior data in a local storage device; and/or, sampling image data from the driving scene data and driving behavior data acquired at a frequency lower than the preset sampling frequency, and transmitting the sampled image data to a cloud server at a first transmission frequency; and/or, sampling other data other than image data from the driving scene data and driving behavior data acquired at a frequency lower than the preset sampling frequency, and transmitting the sampled other data to the cloud server at a second transmission frequency; and/or, sampling image data from the driving scene data and driving behavior data acquired at the preset sampling frequency, and transmitting the sampled image data to the cloud server at a third transmission frequency; and/or, sampling other data other than image data from the driving scene data and driving behavior data acquired at the preset sampling frequency, and transmitting the sampled other data to the cloud server at a fourth transmission frequency.

The above aspect and any possible implementation further provides an implementation:

performing road condition construction, and/or driving scene reconstruction, and/or driving behavior analysis and leaning based on the acquired driving scene data and driving behavior data.

Another aspect of the present disclosure provides a data acquisition apparatus, comprising:

a first acquisition unit configured to acquire driving scene data of a driving scene where the vehicle is located;

a second acquisition unit configured to acquire the driving behavior data on the vehicle;

a determination unit configured to determine whether a preset stable driving condition is met based on the driving scene data of the driving scene where the vehicle is currently located acquired by the first acquisition unit, and the driving behavior data acquired by the second acquisition unit; if the preset stable driving condition is met, instruct the first acquisition unit and the second acquisition unit to acquire the driving scene data and the driving behavior data at a frequency lower than a preset sampling frequency.

The above aspect and any possible implementation further provides an implementation:

the determination unit is further configured to instruct the first acquisition unit and the second acquisition unit to acquire the driving scene data and the driving behavior data at a preset sampling frequency, if the preset stable driving condition is not met.

The above aspect and any possible implementation further provides an implementation: the meeting the preset stable driving condition comprises:

a current driving speed of the vehicle is not greater than a first preset threshold, a magnitude of an acceleration of the vehicle in a driving direction is not greater than a second preset threshold, a magnitude of a transverse acceleration of the vehicle is not greater than a third preset threshold, a magnitude of an angular speed of the vehicle is not greater than a fourth preset threshold, the vehicle does not undergo a start and stop event; and/or the position where the vehicle is currently located is not within a preset range of a specific road condition.

The above aspect and any possible implementation further provides an implementation: the specific road condition includes any one or more of the following: an intersection, a ramp entrance, a tunnel entrance or exit, a change point of the number of lanes, a traffic accident site, a bridge, and a preset location where stop or deceleration is performed.

The above aspect and any possible implementation further provides an implementation: the first acquisition unit is specifically configured to, if the preset stable driving condition is not met, acquire the driving scene data at a first sampling frequency;

the second acquisition unit is specifically configured to, if the preset stable driving condition is not met, acquire the driving scene data at a second sampling frequency.

The above aspect and any possible implementation further provides an implementation: the first acquisition unit is specifically configured to, if the preset stable driving condition is not met, acquire the driving scene data at the first sampling frequency within a preset time length range;

the second acquisition unit is specifically configured to, if the preset stable driving condition is not met, acquire the driving behavior data at the second sampling frequency within a preset time length range.

The above aspect and any possible implementation further provides an implementation: the first acquisition unit is specifically configured to acquire the driving scene data at a third sampling frequency if the preset stable driving condition is not met, wherein the third sampling frequency is less than the first sampling frequency;

the second acquisition unit is specifically configured to acquire the driving behavior data at a fourth sampling frequency if the preset stable driving condition is met; wherein the fourth sampling frequency is less than the second sampling frequency.

The above aspect and any possible implementation further provides an implementation: the first acquisition unit comprises a sensor; wherein the driving scene data comprises: image data of a surrounding environment of the vehicle, position data of the vehicle, and vehicle posture data;

the second acquisition unit is specifically configured to obtain the driving behavior data from the vehicle's Controller Area Network CAN.

The above aspect and any possible implementation further provides an implementation: the first acquisition unit comprises:

a camera configured to acquire image data of the surrounding environment of the vehicle;

a positioning module configured to acquire position data of the vehicle;

an inertial measurement unit configured to acquire vehicle posture data of the vehicle, wherein the vehicle posture data comprises: an acceleration and an angular velocity of the vehicle in three coordinate axis directions in a three-dimensional coordinate system.

The above aspect and any possible implementation further provides an implementation: the determination unit is specifically configured to determine whether the preset stable driving condition is met according to a first preset period based on the acquired driving scene data of the driving scene where the vehicle is currently located and the acquired driving behavior data.

The above aspect and any possible implementation further provides an implementation:

a storage device for storing the acquired driving scene data and the driving behavior data; and/or, a transmission processing unit configured to sample image data from the driving scene data and driving behavior data acquired at a frequency lower than the preset sampling frequency, and transmit the sampled image data to a cloud server at a first transmission frequency; and/or, sample other data other than image data from the driving scene data and driving behavior data acquired at a frequency lower than the preset sampling frequency, and transmit the sampled other data to the cloud server at a second transmission frequency; and/or sample image data from the driving scene data and driving behavior data acquired at the preset sampling frequency, and transmit the sampled image data to the cloud server at a third transmission frequency; and/or, sample other data other than image data from the driving scene data and driving behavior data acquired at the preset sampling frequency, and transmit the sampled other data to the cloud server at a fourth transmission frequency.

The above aspect and any possible implementation further provides an implementation: the data acquisition apparatus further comprises:

an application unit configured to perform road condition construction, and/or driving scene reconstruction, and/or driving behavior analysis and leaning based on the acquired driving scene data and driving behavior data.

A further aspect of the present disclosure provides a vehicle comprising the data acquisition apparatus according to the above aspect.

A further aspect of the present disclosure provides a device comprising:

one or more processors, a storage for storing one or more programs, the one or more programs, when executed by said one or more processors, enable said one or more processors to implement the data acquisition method according to the above aspect.

A further aspect of the present disclosure provides a computer-readable storage medium on which a computer program is stored, the program, when executed by a processor, implementing the data acquisition method according to the above aspect.

According to the above technical solutions, determination is made as to whether a preset stable driving condition is met based on acquired driving scene data of the driving scene where the vehicle is currently located, and acquired driving behavior data; if the preset stable driving condition is met, the driving scene data and the driving behavior data are acquired at a frequency lower than a preset sampling frequency. As a result, it is possible to reduce data redundancy in similar scenes and similar diving modes, reduce the amount of data, reduce occupation of the storage resources and transmission resources and facilitate subsequent analysis.

In addition, according to the technical solutions according to the present disclosure, if the preset stable driving condition is not met, acquiring the driving scene data and driving behavior data at a preset sampling frequency may meet needs of applications such as road condition construction, driving scene reconstruction, driver model construction, driving behavior analysis and learning, vehicle dynamics modeling and simulation etc. for the driving scene data and driving behavior data.

In addition, use of the technical solutions provided by the present disclosure achieves the dynamic acquisition of driving scene data and driving behavior data by scenes and modes, and achieves the flexibility and convenience of data acquisition.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiments of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

A main idea of the present disclosure is determining a current driving scene based on acquired driving scene data of the driving scene where the vehicle is currently located, and acquired driving behavior data, and acquiring the driving scene data and the driving behavior data by using different acquisition frequencies according to the driving scenes.

Figure 1:
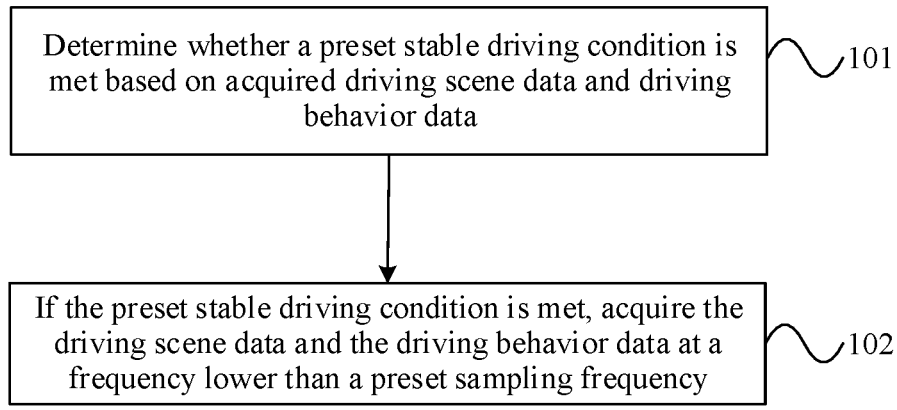
FIG. 1 is a flowchart of a data acquisition method provided by an embodiment of the present disclosure.

FIG. 1 is a flowchart of a data acquisition method provided by an embodiment of the present disclosure.

101: determining whether a preset stable driving condition is met based on acquired driving scene data of the driving scene where the vehicle is currently located, and acquired driving behavior data.

102: if the preset stable driving condition is met, acquiring the driving scene data and the driving behavior data at a frequency lower than a preset sampling frequency. The preset sampling frequency may be a frequency which is preset and may meet demands for acquiring diving scene data and driving behavior data under various driving scenes and driving behavior modes. A magnitude of a value of the preset sampling frequency may be set according to an empirical value, or may be adjusted uniformly according to actual needs.

It needs to be appreciated that a subject for implementing 101-102 may partly or totally be a device or application coupled in the vehicle, or a device or application connected external of the vehicle, or an individual device or application. This is not particularly limited in the present embodiment.

It may be understood that the application may be a native application (nativeAPP) installed on the terminal, or a web application (webAPP) of a browser on the terminal. This is not specifically limited in the present embodiment.

As such, determination is made as to whether a preset stable driving condition is met based on acquired driving scene data of the driving scene where the vehicle is currently located, and acquired driving behavior data; if the preset stable driving condition is met, the driving scene data and the driving behavior data are acquired at a frequency lower than a preset sampling frequency. As a result, it is possible to reduce data redundancy in similar scenes and similar diving modes, reduce the amount of data, reduce occupation of the storage resources and transmission resources and facilitate subsequent analysis.

Optionally, in a possible implementation of the present embodiment, at 101, meeting the preset stable driving condition may include but not limited to: a current driving speed of the vehicle is not greater than a first preset threshold (e.g., 70 KM/h), a magnitude of an acceleration of the vehicle in the driving direction is not greater than a second preset threshold (e.g., 4 m/s$^2$), a magnitude of a transverse acceleration of the vehicle is not greater than a third preset threshold (e.g., 5 m/s$^2$), a magnitude of an angular speed of the vehicle is not greater than a fourth preset threshold (e.g., 45 o/s), the vehicle does not undergo a start and stop event; and/or the position where the vehicle is currently located is not within a preset range of a specific road condition (e.g., the position where the vehicle is currently located is not within a range of 50 m around the specific road condition).

The specific road condition may include but not limited to any one or more of the following: an intersection, a ramp entrance, a tunnel entrance or exit, a change point of the number of lanes, a traffic accident site, a bridge, and a preset location where stop or deceleration is performed.

The magnitude of the acceleration of the vehicle in the driving direction is greater than a second preset threshold. For example, when the acceleration of the vehicle in the driving direction is greater than 4 m/s$^2$, this indicates that the vehicle makes a sudden acceleration action; when the acceleration of the vehicle in the driving direction is less than −4 m/s$^2$, this indicates that the vehicle makes a sudden deceleration action. The magnitude of the transverse acceleration of the vehicle is greater than the third preset threshold and the lasting duration reaches a present time length (e.g., 500 ms). For example, when the direction of x-axis of the 3D coordinate system O-XYZ of the vehicle is along a widthwise direction of the vehicle, the transverse acceleration of the vehicle is greater than 5 m/s$^2$, which indicates that the vehicle makes a leftward lane change action, and the transverse acceleration of the vehicle is less than −4 m/s$^2$, which indicates that the vehicle makes a rightward lane change action. The magnitude of the angular speed of the vehicle is greater than a fourth preset threshold. For example, assuming that the vehicle makes a square in the counterclockwise direction, the angular speed of the vehicle is greater than 45 o/s, which indicates that the vehicle makes a leftward sudden turn action; the transverse acceleration of the vehicle is less than −50 o/s, which indicates that the vehicle makes a rightward sudden turn action.

When the above preset stable driving condition is met, it may be determined that the vehicle is driving stably at a low vehicle speed on a straight road, the vehicle speed does not fluctuate apparently, and the driving scene is simple, so that it is possible to acquire the driving scene data and driving behavior data at a frequency lower than the present sampling frequency, and therefore reduce data redundancy in similar scenes and similar diving modes, reduce the amount of data, reduce occupation of the storage resources and transmission resources and facilitate subsequent analysis.

Otherwise, if any one of the above preset stable traveling conditions is not met, this indicates that the vehicle's driving state is unstable, for example, the following situations happen: the vehicle starts, the vehicle stops, the vehicle passes through a curve, the vehicle crosses a crossing, the vehicle accelerates suddenly, the vehicle decelerates suddenly, the vehicle turns suddenly, and the vehicle changes lanes. To completely record the data under a specific road condition and in a specific driving mode, acquiring the driving scene data and the driving behavior data at the preset sampling frequency may meet needs of applications such as road condition construction, driving scene reconstruction, driver model construction, driving behavior analysis and learning, vehicle dynamics modeling and simulation etc. for the driving scene data and driving behavior data.

Figure 2:
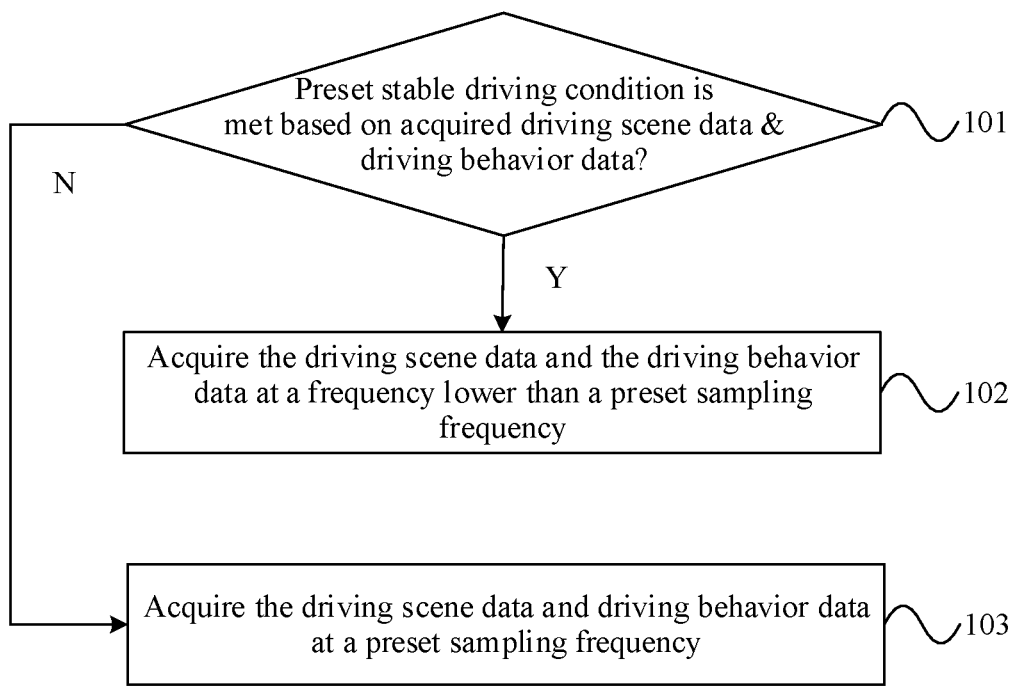
FIG. 2 is a flowchart of a data acquisition method provided by another embodiment of the present disclosure.

Optionally, as shown in FIG. 2, the data acquisition method according to another embodiment of the present disclosure may further comprise: 103: if the preset stable driving condition is not met, acquiring the driving scene data and driving behavior data at the preset sampling frequency.

It needs to be appreciated that a subject for implementing 103 may be a device or application coupled in the vehicle, or a device or application connected external of the vehicle, or an individual device or application. This is not particularly limited in the present embodiment.

It may be understood that the application may be a native application (nativeAPP) installed on the terminal, or a web application (webAPP) of a browser on the terminal. This is not specifically limited in the present embodiment.

In the present embodiment, if the preset stable driving condition is not met, acquiring the driving scene data and driving behavior data at a normal preset sampling frequency may meet needs of applications such as road condition construction, driving scene reconstruction, driver model construction, driving behavior analysis and learning, vehicle dynamics modeling and simulation etc. for the driving scene data and driving behavior data.

Optionally, in a possible implementation of this embodiment, at 103, when the driving scene data and driving behavior data are acquired at a preset sampling frequency, the driving scene data may be acquired at a first sampling frequency, and the driving behavior data may be acquired at a second sampling frequency. The magnitude of the first sampling frequency may be the same as or different from that of the second sampling frequency.

Optionally, in a possible implementation of this embodiment, when the driving scene data is acquired at the first sampling frequency and the driving behavior data is acquired at the second sampling frequency, the driving scene data is acquired at the first sampling frequency and the driving behavior data is acquired at the second sampling frequency within a preset time length range, e.g., 10 s.

In this way, when the driving state of the vehicle is unstable, the driving scene data and driving behavior data may be continuously acquired at a high sampling frequency within the preset time length, so as to achieve complete acquisition of specific road conditions or driving behavior data.

Optionally, in a possible implementation of this embodiment, at 102, when the driving scene data and driving behavior data are acquired at a frequency lower than the preset sampling frequency, the driving scene data may be specifically acquired at the third sampling frequency, and the driving behavior data be specifically acquired at the fourth sampling frequency. The third sampling frequency is less than the first sampling frequency, and the fourth sampling frequency is less than the second sampling frequency. The third sampling frequency may be the same as or different from the fourth sampling frequency.

Optionally, in a possible implementation of this embodiment, before 101, it is further possible to use a sensor to acquire the driving scene data, and obtain the driving behavior data from the vehicle's Controller Area Network (CAN) bus, for example, obtain the driving behavior data from the vehicle's control system, such as VCU or ECU, through the CAN bus. The driving scene data includes: image data of the surrounding environment of the vehicle, position data of the vehicle, and vehicle posture data. The driving behavior data may include but not limited to: gear position, driving mode (autonomous driving or manual driving), brake pedal opening degree, vehicle speed, acceleration, turn lamp status, battery power, steering wheel rotation angle, accelerator opening degree, etc.

Wherein, acquiring the driving scene data with the sensor may include: acquiring image data of the surrounding environment of the vehicle with a camera, acquiring position data of the vehicle with a positioning module, and acquiring vehicle posture data of the vehicle with an Inertial Measurement Unit (IMU). The vehicle posture data includes: an acceleration and an angular velocity of the vehicle in the three coordinate axis directions in the three-dimensional coordinate system. The positioning module is, for example, a Global Positioning System (GPS), and the cameras therein may include multiple long-focal-length cameras and/or short-focal-length cameras deployed around the vehicle.

The directions of the three coordinate axes in the vehicle's three-dimensional coordinate system O-XYZ may be along the width, length, and height directions of the vehicle, or may also be three directions set in other ways. This is not particularly limited by the present embodiment.

The camera, the positioning module, and the inertial measurement unit may acquire data at the same or different frequencies. For example, when the preset stable driving condition is met, the positioning module and the inertial measurement unit may acquire position data and vehicle posture data at a preset third sampling frequency, and the camera may acquire image data at a lower third sampling frequency (lower than the aforementioned preset third sampling frequency) to acquire image data; when the preset stable driving condition is not met, the positioning module and the inertial measurement unit may acquire position data and vehicle posture data at a preset first sampling frequency, and the camera may acquire image data at a lower first sampling frequency (lower than the above-mentioned preset first sampling frequency).

The current driving speed of the vehicle may be obtained from the CAN bus or position data; the acceleration of the vehicle may be obtained from the vehicle posture data, and the angular velocity of the vehicle may be obtained from the position data and the vehicle posture data; whether the vehicle has undergone a start and stop event may be obtained from the CAN bus; whether the current position of the vehicle is within the preset range of specific road conditions may be obtained through the number of bits of the position and the preset map data.

In this way, the current driving scene of the vehicle may be determined based on the acquired image data, location data, vehicle posture data, etc. of the vehicle driving environment. For example, if the vehicle is driving at a constant speed on a straight road, the data may be acquired at a low sampling frequency; for example, if the vehicle is driving on a mountain road or a bridge, data may be acquired at a high sampling frequency to realize the dynamic acquisition of driving scene data and driving behavior data by scenes and modes, thus realizing the flexibility and convenience of data acquisition.

Optionally, in a possible implementation of this embodiment, at 101, whether the preset stable driving condition is met may be determined according to a first preset period (e.g., 0.5 s) based on the the acquired driving scene data of the driving scene where the vehicle is driving and the driving behavior data.

As such, it is possible to implement periodic judgment of whether the stable driving condition is preset for the vehicle, and implement timely adjustment of dynamic acquisition of the driving scene data and driving behavior data by scenes and modes.

Optionally, in a possible implementation of this embodiment, after 102 and/or 103, the acquired driving scene data and driving behavior data may also be stored in a local storage device. The local storage device is for example a U disk, a large-capacity SD card, a magnetic disk etc.

Optionally, in a possible implementation of this embodiment, after 102, it is further possible to sample image data from the driving scene data and driving behavior data acquired at a frequency lower than the preset sampling frequency, and transmit the sampled image data to a cloud server at a first transmission frequency; and/or, sample other data other than image data from the driving scene data and driving behavior data acquired at a frequency lower than the preset sampling frequency, and transmit the sampled other data to the cloud server at a second transmission frequency.

Optionally, in a possible implementation of this embodiment, after 103, it is further possible to sample image data from the driving scene data and driving behavior data acquired at the preset sampling frequency, and transmit the sampled image data to a cloud server at a third transmission frequency; and/or, sample other data other than image data from the driving scene data and driving behavior data acquired at the preset sampling frequency, and transmit the sampled other data to the cloud server at a fourth transmission frequency.

As such, it is possible to store all or part of the acquired driving scene data and driving behavior data in the local storage device, and uploadable or part of the acquired driving scene data and driving behavior data to the cloud server in time for subsequent application.

For example, the driving behavior data, location data and vehicle posture data may be uploaded to the cloud server; because the amount of image data is relatively large, the image data may be stored in the local storage device, and the stored image data may be uploaded periodically (such as a month) to the cloud server.

Optionally, in a possible implementation of this embodiment, after 102 and/or 103, road condition construction, and/or driving scene reconstruction, and/or driving behavior analysis and leaning may also be performed based on the acquired driving scene data and driving behavior data.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, embodiments are respectively described with different emphasis being placed, and reference may be made to related depictions in other embodiments for portions not detailed in a certain embodiment.

Figure 3:
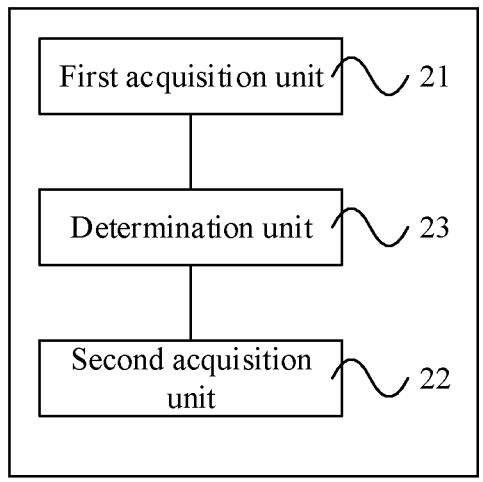
FIG. 3 is a schematic structural diagram of a data acquisition apparatus provided by an embodiment of the present disclosure.

FIG. 3 is a schematic structural diagram of a data acquisition apparatus provided by an embodiment of the present disclosure. As shown in FIG. 3, the data acquisition apparatus according to the present embodiment may include a first acquisition unit 21, a second acquisition unit 22 and a determination unit 23. The first acquisition unit 21 is configured to acquire the driving scene data of the driving scene where the vehicle is located; the second acquisition unit 22 is configured to acquire the driving behavior data on the vehicle; the determination unit 23 is configured to determine whether a preset stable driving condition is met based on the driving scene data of the driving scene where the vehicle is currently located acquired by the first acquisition unit 21, and the driving behavior data acquired by the second acquisition unit 22; if the preset stable driving condition is met, instruct the first acquisition unit 21 and the second acquisition unit 22 to acquire the driving scene data and the driving behavior data at a frequency lower than a preset sampling frequency.

It needs to be appreciated that the data acquisition apparatus according to the present embodiment may partly or totally be a device or application coupled in the vehicle, or a device or application connected external of the vehicle, or an individual device or application. This is not particularly limited in the present embodiment.

It may be understood that the application may be a native application (nativeAPP) installed on the terminal, or a web application (webAPP) of a browser on the terminal. This is not specifically limited in the present embodiment.

As such, determination is made as to whether the preset stable driving condition is met based on acquired driving scene data of the driving scene where the vehicle is currently located, and acquired driving behavior data; if the preset stable driving condition is met, the driving scene data and the driving behavior data are acquired at a frequency lower than a preset sampling frequency. As a result, it is possible to reduce data redundancy in similar scenes and similar diving modes, reduce the amount of data, reduce occupation of the storage resources and transmission resources and facilitate subsequent analysis.

Optionally, in a possible implementation of the present embodiment, the determination unit 23 is further configured to instruct the first acquisition unit 21 and the second acquisition unit 22 to acquire the driving scene data and the driving behavior data at a preset sampling frequency, if the preset stable driving condition is not met.

As such, if the preset stable driving condition is not met, acquiring the driving scene data and driving behavior data at a preset sampling frequency may meet needs of applications such as road condition construction, driving scene reconstruction, driver model construction, driving behavior analysis and learning, vehicle dynamics modeling and simulation etc. for the driving scene data and driving behavior data.

Optionally, in a possible implementation of the present embodiment, meeting the preset stable driving condition may include but not limited to: a current driving speed of the vehicle is not greater than a first preset threshold (e.g., 70 KM/h), a magnitude of an acceleration of the vehicle in the driving direction is not greater than a second preset threshold (e.g., 4 m/s$^2$), a magnitude of a transverse acceleration of the vehicle is not greater than a third preset threshold (e.g., 5 m/s$^2$), a magnitude of an angular speed of the vehicle is not greater than a fourth preset threshold (e.g., 45 o/s), the vehicle does not undergo a start and stop event; and/or the position where the vehicle is currently located is not within a preset range of a specific road condition (e.g., the position where the vehicle is currently located is not within a range of 50 m around the specific road condition).

The specific road condition may include but not limited to any one or more of the following: an intersection, a ramp entrance, a tunnel entrance or exit, a change point of the number of lanes, a traffic accident site, a bridge, and a preset location where stop or deceleration is performed.

The magnitude of the acceleration of the vehicle in the driving direction is greater than a second preset threshold. For example, when the acceleration of the vehicle in the driving direction is greater than 4 m/s$^2$, this indicates that the vehicle makes a sudden acceleration action; when the acceleration of the vehicle in the driving direction is less than −4 m/s$^2$, this indicates that the vehicle makes a sudden deceleration action. The magnitude of the transverse acceleration of the vehicle is greater than the third preset threshold and the lasting duration reaches a present time length (e.g., 500 ms). For example, when the direction of x-axis of the 3D coordinate system O-XYZ of the vehicle is along a widthwise direction of the vehicle, the transverse acceleration of the vehicle is greater than 5 m/s$^2$, which indicates that the vehicle makes a leftward lane change action, and the transverse acceleration of the vehicle is less than −4 m/s$^2$, which indicates that the vehicle makes a rightward lane change action. The magnitude of the angular speed of the vehicle is greater than a fourth preset threshold. For example, assuming that the vehicle makes a square in the counterclockwise direction, the angular speed of the vehicle is greater than 45 o/s, which indicates that the vehicle makes a leftward sudden turn action; the transverse acceleration of the vehicle is less than −50 o/s, which indicates that the vehicle makes a rightward sudden turn action.

When the above preset stable driving condition is met, it may be determined that the vehicle is driving stably at a low vehicle speed on a straight road, the vehicle speed does not fluctuate apparently, and the driving scene is simple, so that it is possible to acquire the driving scene data and driving behavior data at a frequency lower than the present sampling frequency, and therefore reduce data redundancy in similar scenes and similar diving modes, reduce the amount of data, reduce occupation of the storage resources and transmission resources and facilitate subsequent analysis.

Otherwise, if any one of the above preset stable traveling conditions is not met, this indicates that the vehicle's driving state is unstable, for example, the following situations happen: the vehicle starts, the vehicle stops, the vehicle passes through a curve, the vehicle crosses a crossing, the vehicle accelerates suddenly, the vehicle decelerates suddenly, the vehicle turns suddenly, and the vehicle changes lanes. To completely record the data under a specific road condition and in a specific driving mode, acquiring the driving scene data and the driving behavior data at the preset sampling frequency may meet needs of applications such as road condition construction, driving scene reconstruction, driver model construction, driving behavior analysis and learning, vehicle dynamics modeling and simulation etc. for the driving scene data and driving behavior data.

Optionally, in a possible implementation of the present embodiment, the first acquisition unit 21 is specifically configured to, if the preset stable driving condition is not met, acquire the driving scene data at the first sampling frequency; the second acquisition unit 22 is specifically configured to, if the preset stable driving condition is not met, acquire the driving scene data at the second sampling frequency, wherein the magnitude of the first sampling frequency may be the same as or different from that of the second sampling frequency.

Optionally, in a possible implementation of this embodiment, the first acquisition unit 21 is specifically configured to, if the preset stable driving condition is not met, acquire the driving scene data at the first sampling frequency within a preset time length range, e.g., within 10 s; the second acquisition unit 22 is specifically configured to, if the preset stable driving condition is not met, acquire the driving behavior data at the second sampling frequency within a preset time length range.

As such, when the driving state of the vehicle is unstable, the driving scene data and driving behavior data may be continuously acquired at a high sampling frequency within the preset time length range, so as to achieve complete acquisition of specific road conditions or driving behavior data.

Optionally, in a possible implementation of this embodiment, the first acquisition unit 21 is specifically configured to acquire the driving scene data at a third sampling frequency if the preset stable driving condition is not met, wherein the third sampling frequency is less than the first sampling frequency; the second acquisition unit 22 is specifically configured to acquire the driving behavior data at a fourth sampling frequency if the preset stable driving condition is met; wherein the fourth sampling frequency is less than the second sampling frequency. The magnitude of the third sampling frequency may be the same as or different from that of the fourth sampling frequency.

Optionally, in a possible implementation of the present embodiment, the first acquisition unit 21 may include a sensor. The driving scene data may include: image data of the surrounding environment of the vehicle, position data of the vehicle, and vehicle posture data; the second acquisition unit 22 is specifically configured to obtain the driving behavior data from the vehicle's CAN bus, for example, obtain the driving behavior data from the vehicle's control system, such as VCU or ECU, through the CAN bus. The driving behavior data may include but not limited to: gear position, driving mode (autonomous driving or manual driving), brake pedal opening degree, vehicle speed, acceleration, turn lamp status, battery power, steering wheel rotation angle, accelerator opening degree, etc.

Optionally, in a possible implementation of the present embodiment, the first acquisition unit 21 may include a camera configured to acquire image data of the surrounding environment of the vehicle, and the camera may include multiple long-focal-length cameras and/or short-focal-length cameras deployed around the vehicle; a positioning module for example a Global Position System (GPS) configured to acquire the position data of the vehicle; an inertial measurement unit configured to acquire the vehicle posture data of the vehicle. The vehicle posture data includes: an acceleration and an angular velocity of the vehicle in the three coordinate axis directions in the three-dimensional coordinate system. The camera, the positioning module and the inertial measurement unit may acquire data at the same or different sampling frequencies. For example, if the preset stable driving condition is met, the positioning module and the inertial measurement unit may acquire the position data and the vehicle posture data at a preset third sampling frequency, and the camera may acquire the image data at a lower third sampling frequency (lower than the preset third sampling frequency); when the preset stable driving condition is not met, the positioning module and the inertial measurement unit may acquire the position data and the vehicle posture data at a preset first sampling frequency, and the camera may acquire the image data at a lower first sampling frequency (lower than the preset first sampling frequency).

The directions of the three coordinate axes in the vehicle's three-dimensional coordinate system O-XYZ may be along the width, length, and height directions of the vehicle, or may also be three directions set in other ways. This is not particularly limited by the present embodiment.

The current driving speed of the vehicle may be obtained from the CAN bus or position data; the acceleration of the vehicle may be obtained from the vehicle posture data, and the angular velocity of the vehicle may be obtained from the position data and the vehicle posture data; whether the vehicle has undergone a start and stop event may be obtained from the CAN bus; whether the current position of the vehicle is within the preset range of specific road conditions may be obtained through the number of bits of the position and the preset map data.

In this way, the current driving scene of the vehicle may be determined based on the acquired image data, location data, vehicle posture data, etc. of the vehicle driving environment. For example, if the vehicle is driving at a constant speed on a straight road, the data may be acquired at a low sampling frequency; for example, if the vehicle is driving on a mountain road or a bridge, data may be acquired at a high sampling frequency to realize the dynamic acquisition of driving scene data and driving behavior data by scenes and modes, thus realizing the flexibility and convenience of data acquisition.

Optionally, in a possible implementation of this embodiment, the determination unit 23 is specifically configured to determine whether the preset stable driving condition is met according to a first preset period based on the acquired driving scene data of the driving scene where the vehicle is currently located and the acquired driving behavior data.

In this way, it is possible to implement periodic judgment of whether the stable driving condition is preset for the vehicle, and implement timely adjustment of dynamic acquisition of the driving scene data and driving behavior data by scenes and modes.

Figure 4:
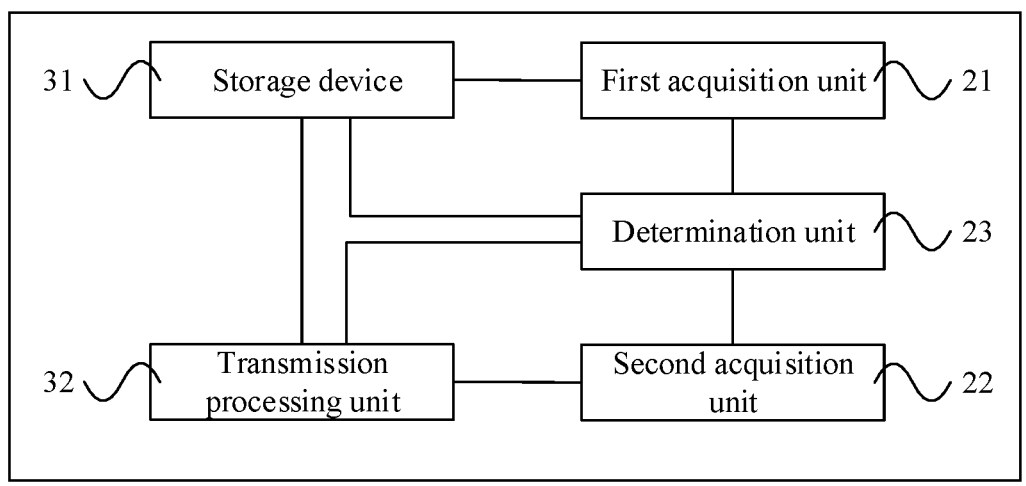
FIG. 4 is a schematic structural diagram of a data collection apparatus provided by another embodiment of the present disclosure.

Optionally, in a possible implementation of this embodiment, as shown in FIG. 4, the data acquisition apparatus according to the present embodiment may further comprise a storage device 31 and/or a transmission processing unit 32. The storage device 31 is configured to store the acquired driving scene data and driving behavior data. The storage device 31 for example may be a U disk, a large-capacity SD card, a magnetic disk etc. The transmission processing unit 32 is configured to sample image data from the driving scene data and driving behavior data acquired at a frequency lower than the preset sampling frequency, and transmit the sampled image data to a cloud server at a first transmission frequency; and/or, sample other data other than image data from the driving scene data and driving behavior data acquired at a frequency lower than the preset sampling frequency, and transmit the sampled other data to the cloud server at a second transmission frequency; and/or sample image data from the driving scene data and driving behavior data acquired at the preset sampling frequency, and transmit the sampled image data to the cloud server at a third transmission frequency; and/or, sample other data other than image data from the driving scene data and driving behavior data acquired at the preset sampling frequency, and transmit the sampled other data to the cloud server at a fourth transmission frequency.

As such, it is possible to store all or part of the acquired driving scene data and driving behavior data in the local storage device 31, and upload all or part of the acquired driving scene data and driving behavior data to the cloud server in time for subsequent application.

For example, the driving behavior data, location data and vehicle posture data may be uploaded to the cloud server; because the amount of image data is relatively large, the image data may be stored in the local storage device, and the stored image data may be uploaded periodically (such as a month) to the cloud server.

Optionally, in a possible implementation of this embodiment, as shown in FIG. 4, the data acquisition apparatus according to the present embodiment may further include an application unit 33 configured to perform road condition construction, and/or driving scene reconstruction, and/or driving behavior analysis and leaning based on the acquired driving scene data and driving behavior data.

It needs to be appreciated that the data acquisition method in the embodiments corresponding to FIG. 1 to FIG. 2 may be implemented by the data acquisition apparatus according to the present embodiment. For detailed depictions, reference may be made to the relevant content in the embodiments corresponding to FIG. 1 to FIG. 2. No details will be presented any more here.

In the present embodiment, determination is made as to whether a preset stable driving condition is met based on acquired driving scene data of the driving scene where the vehicle is currently located, and acquired driving behavior data; if the preset stable driving condition is met, the driving scene data and the driving behavior data are acquired at a frequency lower than a preset sampling frequency. As a result, it is possible to reduce data redundancy in similar scenes and similar diving modes, reduce the amount of data, reduce occupation of the storage resources and transmission resources and facilitate subsequent analysis. If the preset stable driving condition is not met, acquiring the driving scene data and driving behavior data at a preset sampling frequency may meet needs of applications such as road condition construction, driving scene reconstruction, driver model construction, driving behavior analysis and learning, vehicle dynamics modeling and simulation etc. for the driving scene data and driving behavior data.

In addition, use of the technical solution provided by the present disclosure achieves the dynamic acquisition of driving scene data and driving behavior data by scenes and modes, and achieves the flexibility and convenience of data acquisition.

In addition, an embodiment of the present disclosure further comprises a vehicle comprising the data acquisition apparatus according any embodiment shown in FIG. 3-FIG. 4.

In addition, an embodiment of the present disclosure further comprises a device comprising: one or more processor; a storage device for storing the one or more processors, the one or more programs, being executed by the one or more processors, causing the one or more processors to implement the data acquisition method according any embodiment shown in FIG. 1-FIG. 2.

In addition, an embodiment of the present disclosure further provides a computer-readable storage medium storing a computer program thereon, the computer program, when being executed by the processor, implementing the data acquisition method according any embodiment shown in FIG. 1-FIG. 2.

Figure 5:
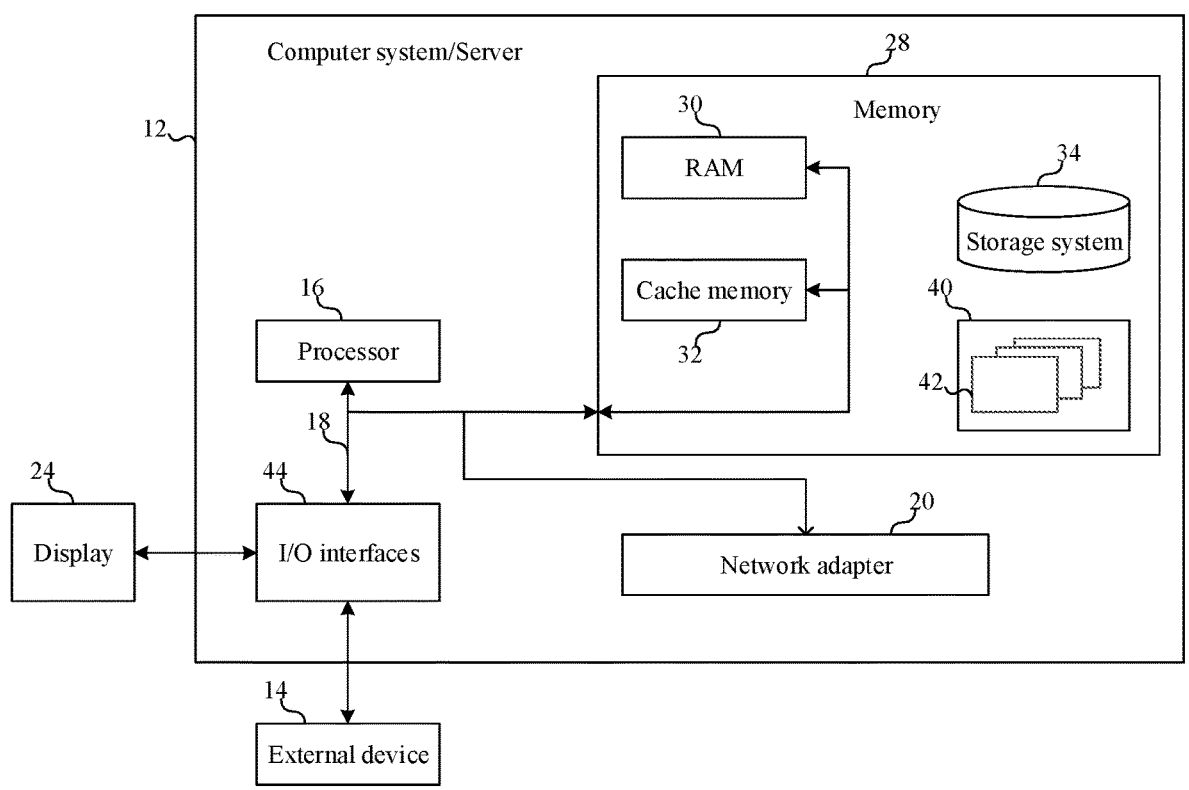
FIG. 5 illustrates a block diagram of an example computer system/server adapted to implement an implementation mode of the present disclosure.

FIG. 5 illustrates a block diagram of an example computer system/server adapted to implement an implementation mode of the present disclosure. The computer system/server shown in FIG. 5 is only an example, and should not bring any limitation to the functions and use scope of the embodiments of the present disclosure.

As shown in FIG. 5, the computer system/server is shown in the form of a general-purpose computing device. The components of the computer system/server may include, but are not limited to, one or more processors or processing units 16, a storage device or system memory 28, and a bus 18 that couples various system components including the system memory 28 and the processing unit 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server typically includes a variety of computer system readable media. Such media may be any available media that is accessible by computer system/server, and it includes both volatile and non-volatile media, removable and non-removable media.

Memory 28 can include computer system readable media in the form of volatile memory, such as random access memory (RAM) 30 and/or cache memory 32. Computer system/server may further include other removable/non-removable, volatile/non-volatile computer system storage media. By way of example only, storage system 34 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The system memory 28 may include at least one program product having a set of (e.g., at least one) program modules that are configured to carry out the functions of embodiments of the present disclosure.

Program/utility 40, having a set of (at least one) program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server may also communicate with one or more external devices 14 such as a keyboard, a pointing device, a display 24, etc.; with one or more devices that enable a user to interact with computer system/server; and/or with any devices (e.g., network card, modem, etc.) that enable computer system/server to communicate with one or more other computing devices. Such communication can occur via Input/Output (I/O) interfaces 44. Still yet, computer system/server can communicate with one or more networks such as a local area network (LAN), a general wide area network (WAN), and/or a public network (e.g., the Internet) via network adapter 20. As shown in the figure, network adapter 20 communicates with the other communication modules of computer system/server via bus 18. It should be understood that although not shown in FIG. 5, other hardware and/or software modules could be used in conjunction with computer system/server. Examples, include, but are not limited to: microcode, device drivers, redundant processing units, external disk drive arrays, RAID systems, tape drives, and data archival storage systems, etc.

The processing unit 16 executes various function applications and data processing, e.g., implements the image processing method according to the embodiment corresponding to FIG. 1, by running the programs stored in the system memory 28.

Another embodiment of the present disclosure further provides a computer-readable storage medium on which a computer program is stored. The program, when executed by a processor, can implement the image processing method provided by the embodiment corresponding to FIG. 1.

Specifically, the computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. A computer-implemented data acquisition method, wherein the method comprises:
   determining whether a preset stable driving condition is met based on acquired driving scene data of a driving scene where a vehicle is currently located, and acquired driving behavior data, wherein,
   the driving scene data comprises:
      image data of the surrounding environment of the vehicle;
      position data of the vehicle; and
      vehicle posture data, and
   the driving behavior data comprises:
      gear position;
      driving mode;
      brake pedal opening degree;
      vehicle speed;
      acceleration;
      turn lamp status;
      battery power;
      steering wheel rotation angle; and
      accelerator opening degree;
   if the preset stable driving condition is met, acquiring the driving scene data and the driving behavior data at a frequency lower than a preset sampling frequency, the preset sampling frequency being a frequency which can meet demands of a preset application for acquiring driving scene data and driving behavior data, the preset application comprising a construction of a road condition, a driving scene reconstruction, a driver model construction, a driving behavior analysis and learning, a vehicle dynamics modeling and simulation, wherein a road condition comprises: an intersection, a ramp entrance, a tunnel entrance or exit, a change point of a number of lanes, a traffic accident site, a bridge, a preset location where a stop or deceleration is perform, or combinations thereof;
   if the preset stable driving condition is not met, acquiring the driving scene data at a first sampling frequency within a preset time length range and acquiring the driving behavior data at a second sampling frequency within the preset time length range,
   wherein the acquiring the driving scene data and the driving behavior data at a frequency lower than a preset sampling frequency comprises: acquiring the driving scene data at a third sampling frequency and acquiring the driving behavior data at a fourth sampling frequency, wherein the third sampling frequency is less than the first sampling frequency, and the fourth sampling frequency is less than the second sampling frequency.

2. The method according to claim 1, wherein the meeting the preset stable driving condition comprises:
   a current driving speed of the vehicle is not greater than a first preset threshold, a magnitude of an acceleration of the vehicle in a driving direction is not greater than a second preset threshold, a magnitude of a transverse acceleration of the vehicle is not greater than a third preset threshold, a magnitude of an angular speed of the vehicle is not greater than a fourth preset threshold, the vehicle does not undergo a start and stop event; and/or the position where the vehicle is currently located is not within a preset range of a specific road condition.

3. The method according to claim 1, wherein before determining whether a preset stable driving condition is met based on acquired driving scene data of a driving scene where the vehicle is currently located, and acquired driving behavior data, the method further comprises:
   acquiring the driving scene data with a sensor and obtaining the driving behavior data from the vehicle's Controller Area Network CAN.

4. The method according to claim 3, wherein the acquiring the driving scene data with a sensor comprises:
   acquiring image data of the surrounding environment of the vehicle with a camera, acquiring position data of the vehicle with a positioning module, and acquiring vehicle posture data of the vehicle with an inertial measurement unit, wherein the vehicle posture data comprises: an acceleration and an angular velocity of the vehicle in three coordinate axis directions in a three-dimensional coordinate system.

5. The method according to claim 1, wherein the determining whether a preset stable driving condition is met based on acquired driving scene data of a driving scene where the vehicle is currently located, and acquired driving behavior data comprises:
   determining periodically whether the preset stable driving condition is met according to a first preset period based on the acquired driving scene data of the driving scene where the vehicle is currently located and the acquired driving behavior data.

6. The method according to claim 1, wherein after the acquiring the driving scene data and the driving behavior data, the method further comprises:
   storing the acquired driving scene data and the driving behavior data in a local storage device; and/or,
   sampling image data from the driving scene data and driving behavior data acquired at a frequency lower than the preset sampling frequency, and transmitting the sampled image data to a cloud server at a first transmission frequency; and/or, sampling other data other than image data from the driving scene data and driving behavior data acquired at a frequency lower than the preset sampling frequency, and transmitting the sampled other data to the cloud server at a second transmission frequency; and/or,
   sampling image data from the driving scene data and driving behavior data acquired at the preset sampling frequency, and transmitting the sampled image data to the cloud server at a third transmission frequency; and/or, sampling other data other than image data from the driving scene data and driving behavior data acquired at the preset sampling frequency, and transmitting the sampled other data to the cloud server at a fourth transmission frequency.

7. The method according to claim 1, wherein the method further comprises:
   performing at least one preset application based on the acquired driving scene data and driving behavior data.

8. An electronic device, comprising:
   at least one processor; and
   a memory communicatively connected with the at least one processor;
   wherein the memory stores instructions executable by the at least one processor, and the instructions are executed by the at least one processor to enable the at least one processor to perform a data acquisition method, wherein the data acquisition method comprises:
   determining whether a preset stable driving condition is met based on acquired driving scene data of a driving scene where a vehicle is currently located, and acquired driving behavior data, wherein, the driving scene data comprises:
: image data of a surrounding environment of the vehicle;
position data of the vehicle; and
vehicle posture data; and
the driving behavior data comprises:
: gear position;
driving mode;
brake pedal opening degree;
vehicle speed;
acceleration;
turn lamp status;
battery power;
steering wheel rotation angle; and
accelerator opening degree;
if the preset stable driving condition is met, acquiring the driving scene data and the driving behavior data at a frequency lower than a preset sampling frequency, the preset sampling frequency being a frequency which can meet demands of a preset application for acquiring driving scene data and driving behavior data, the preset application comprising a construction of a road condition, a driving scene reconstruction, a driver model construction, a driving behavior analysis and learning, a vehicle dynamics modeling and simulation, wherein a road condition comprises: an intersection, a ramp entrance, a tunnel entrance or exit, a change point of a number of lanes, a traffic accident site, a bridge, a preset location where a stop or deceleration is perform, or combinations thereof;
if the preset stable driving condition is not met, acquiring the driving scene data at a first sampling frequency within a preset time length range and acquiring the driving behavior data at a second sampling frequency within the preset time length range, wherein the acquiring the driving scene data and the driving behavior data at a frequency lower than a preset sampling frequency comprises: acquiring the driving scene data at a third sampling frequency and acquiring the driving behavior data at a fourth sampling frequency, wherein the third sampling frequency is less than the first sampling frequency, and the fourth sampling frequency is less than the second sampling frequency.

9. The electronic device according to claim 8, wherein the meeting the preset stable driving condition comprises:
: a current driving speed of the vehicle is not greater than a first preset threshold, a magnitude of an acceleration of the vehicle in a driving direction is not greater than a second preset threshold, a magnitude of a transverse acceleration of the vehicle is not greater than a third preset threshold, a magnitude of an angular speed of the vehicle is not greater than a fourth preset threshold, the vehicle does not undergo a start and stop event; and/or the position where the vehicle is currently located is not within a preset range of a specific road condition.

10. A non-transitory computer-readable storage medium storing computer instructions therein, wherein the computer instructions are used to cause the computer to perform a data acquisition method, wherein the data acquisition method comprises:
: determining whether a preset stable driving condition is met based on acquired driving scene data of a driving scene where a vehicle is currently located, and acquired driving behavior data, wherein,
: the driving scene data comprises:
: image data of a surrounding environment of the vehicle;
position data of the vehicle; and
vehicle posture data; and
the driving behavior data comprises:
: gear position;
driving mode;
brake pedal opening degree;
vehicle speed;
acceleration;
turn lamp status;
battery power;
steering wheel rotation angle; and
accelerator opening degree;
if the preset stable driving condition is met, acquiring the driving scene data and the driving behavior data at a frequency lower than a preset sampling frequency, the preset sampling frequency being a frequency which can meet demands of a preset application for acquiring driving scene data and driving behavior data, the preset application comprising a construction of a road condition, a driving scene reconstruction, a driver model construction, a driving behavior analysis and learning, a vehicle dynamics modeling and simulation, wherein a road condition comprises: an intersection, a ramp entrance, a tunnel entrance or exit, a change point of the number of lanes, a traffic accident site, a bridge, a preset location where stop or deceleration is performed, or combinations thereof;
if the preset stable driving condition is not met, acquiring the driving scene data at a first sampling frequency within a preset time length range and acquiring the driving behavior data at a second sampling frequency within the preset time length range, wherein the acquiring the driving scene data and the driving behavior data at a frequency lower than a preset sampling frequency comprises: acquiring the driving scene data at a third sampling frequency and acquiring the driving behavior data at a fourth sampling frequency, wherein the third sampling frequency is less than the first sampling frequency, and the fourth sampling frequency is less than the second sampling frequency.

* * * * *